(12) United States Patent
Sethuraman et al.

(10) Patent No.: US 12,015,762 B2
(45) Date of Patent: Jun. 18, 2024

(54) DMVR USING DECIMATED PREDICTION BLOCK

(71) Applicant: HUAWEI TECHNOLOGIES CO., LTD., Guangdong (CN)

(72) Inventors: Sriram Sethuraman, Bangalore (IN); Semih Esenlik, Munich (DE); Jeeva Raj A, Rasipuram (IN); Sagar Kotecha, Maharashtra (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 17/466,129

(22) Filed: Sep. 3, 2021

(65) Prior Publication Data

US 2021/0400259 A1 Dec. 23, 2021
US 2022/0368888 A9 Nov. 17, 2022

Related U.S. Application Data

(63) Continuation of application No. PCT/CN2020/077870, filed on Mar. 5, 2020.

(30) Foreign Application Priority Data

Mar. 5, 2019 (IN) .............................. 201931008547

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11);
(Continued)

(58) Field of Classification Search
None
See application file for complete search history.

(56) References Cited

U.S. PATENT DOCUMENTS 6,091,460 A 7/2000 Hatano et al.
2013/0022123 A1 1/2013 Ueda et al.
(Continued)

FOREIGN PATENT DOCUMENTS

TW 201840183 A 11/2018

OTHER PUBLICATIONS

Document: JVET-G1001-v1, Jianle Chen et al, Algorithm Description of Joint Exploration Test Model 7 (JEM 7), Joint Video Exploration Team (JVET) of ITU-T SG 16 WP 3 and ISO/IEC JTC 1/SC 29/WG 11, 7th Meeting: Torino, IT, Jul. 13-21, 2017, total 50 pages.
(Continued)

*Primary Examiner* — Kaitlin A Retallick
(74) *Attorney, Agent, or Firm* — WOMBLE BOND DICKINSON (US) LLP

(57) ABSTRACT

The present disclosure provides an inter prediction method, comprising the steps of obtaining an initial motion vector and a reference picture for bi-prediction; obtaining sets of candidate sample positions in the reference picture according to the initial motion vector and candidate motion vectors, wherein each candidate motion vector is derived by the initial motion vector and a respective motion vector offset, and wherein each set of candidate sample positions corresponds to each candidate motion vector; obtaining a respective set of sample positions from each set of candidate sample positions; computing a matching cost for each candidate motion vector within each set of sample positions; obtaining a refined motion vector based on the computed matching cost of each candidate motion vector; and obtain-
(Continued)

ing prediction values for a current block based on the refined motion vector.

18 Claims, 16 Drawing Sheets

(51) Int. Cl.
*H04N 19/137* (2014.01)
*H04N 19/159* (2014.01)
*H04N 19/176* (2014.01)
*H04N 19/46* (2014.01)

(52) U.S. Cl.
CPC ......... *H04N 19/159* (2014.11); *H04N 19/176* (2014.11); *H04N 19/46* (2014.11)

(56) References Cited

U.S. PATENT DOCUMENTS

| | | |
|---|---|---|
| 2013/0322536 A1 | 12/2013 | Yang |
| 2014/0301467 A1 | 10/2014 | Thirumalai et al. |
| 2018/0098063 A1* | 4/2018 | Chen ................ H04N 19/52 |
| 2018/0184117 A1 | 6/2018 | Chen et al. |
| 2018/0199057 A1 | 7/2018 | Chuang et al. |
| 2020/0296414 A1* | 9/2020 | Park ................ H04N 19/176 |
| 2021/0120262 A1* | 4/2021 | Chen ................ H04N 19/513 |
| 2021/0227211 A1* | 7/2021 | Liu ................ H04N 19/59 |
| 2022/0150507 A1* | 5/2022 | Lin ................ H04N 19/132 |

OTHER PUBLICATIONS

Document: JVET-M1001-v3, Benjamin Bross et al, Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, total 254 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
JVET-K0105 PDF, Hongbin Liu et al, CE9-related: Simplification of Decoder Side Motion Vector Derivation, Joint Video Experts Team (JVET) of ITU-T SG 16 WP 3 and ISO/IEC JTC 1/SC 29/WG 11,11th Meeting: Ljubljana, SI, Jul. 10-18, 2018, 7 pages, XP030199622.
Document: JVET-L0177, Xu Chen et al, CE 9: DMVR Simplifications (Test9.2.8), Joint Video Experts Team (JVET) of ITU-T SG 16 WP 3 and ISO/IEC JTC 1/SC 29/WG11, 12th Meeting: Macao, CN, Oct. 3-12, 2018, 4 pages, XP030194174.
Document: JVET-K0359-v2, Chun-Chi Chen et al, CE9.2.5/9.2.6: DMVR with Template-free Bilateral Matching, Joint Video Experts Team (JVET) of ITU-T SG 16 WP 3 and ISO/IEC JTC 1/SC 29/WG 11, 11th Meeting: Ljubljana, SI, Jul. 10-18, 2018, 5 pages.
Hongbin Liu et al., "CE9-related: Simplification of Decoder Side Motion Vector Derivation", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0105-v1, total:3 pages.
Chun-Chi Chen et al., "Non-CE9.2.1.e: Non-local-mean-based MRSAD and Row-subsampled Search Pattern for DMVR", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0516-v3, total: 4 pages.

* cited by examiner

DMVR USING DECIMATED PREDICTION BLOCK

CROSS-REFERENCE TO RELATED APPLICATIONS

This application is a continuation of International Application No. PCT/CN2020/077870, filed on Mar. 5, 2020, which claims priority to India Patent Application No. IN201931008547, filed Mar. 5, 2019. The disclosures of the aforementioned applications are hereby incorporated by reference in their entireties.

TECHNICAL FIELD

Embodiments of the present application (disclosure) generally relate to the field of picture processing and more particularly to the set of prediction samples used during search in a decoder-side motion refinement method.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present disclosure provide apparatuses and methods for encoding and decoding according to the independent claims.

The foregoing and other objects are achieved by the subject matter of the independent claims. Further implementation forms are apparent from the dependent claims, the description and the figures.

According to a first aspect, the present disclosure provides an inter prediction method, comprising the operations of obtaining an initial motion vector and a reference picture for bi-prediction; obtaining sets of candidate sample positions in the reference picture according candidate motion vectors, wherein each candidate motion vector is derived as the initial motion vector and a respective motion vector offset, and wherein each set of candidate sample positions corresponds to each candidate motion vector; obtaining a respective set of sample positions from each set of candidate sample positions; computing a matching cost for each candidate motion vector within each set of sample positions; obtaining a refined motion vector based on the computed matching cost of each candidate motion vector; and obtaining prediction values for a current block based on the refined motion vector.

The method according to the first aspect reduces the complexity of the prediction process associated with generating predicted samples used for computing matching cost values.

In an embodiment form of the method according to the first aspect as such, the initial motion vector and/or the reference picture are obtained based on indication information signaled in a bitstream. Since the initial motion vectors are signaled in the bitstream, it might not be possible to represent the initial motion vector with very high accuracy because this would increase the bitrate, and therefore the motion vector refinement process is utilized to improve the initial motion vector even when the accuracy of the initial motion vector is not very high.

In an embodiment form of the method according to any preceding implementation or the first aspect as such, the initial motion vector is obtained according to a motion vector predictor and a motion vector difference value signaled in the bitstream. The motion vector can thus be determined based on an indication information in the bitstream defining the initial motion vectors and a signaled difference value.

In an embodiment form of the method according to the preceding implementation, the motion vector predictor is indicated by an index signaled in the bitstream, wherein the index is used to indicate a position in a list of candidate vector. This is an efficient way regarding the number of bits to include the initial motion vector in the bitstream.

The initial motion vectors can be determined based on an indication information in the bitstream. For example, an index might be signaled in the bitstream, wherein the index indicates a position in a list of candidate motion vectors. In another example, a motion vector predictor index and motion vector difference value can be signaled in the bitstream.

In an embodiment form of the method according to any preceding implementation or the first aspect as such, the matching cost is computed using a similarity metric, a dis-similarity metric, a sum of absolute differences (SAD), a mean removed sum of absolute differences (MRSAD), or a sum of squared errors (SSE). These are useful functions to calculate the matching cost.

In an embodiment form of the method according to any preceding implementation or the first aspect as such, a set of the candidate sample positions is within a bounding rectangular region, and the bounding rectangular region is computed using the initial motion vector, a top-left position of the current block, and a motion vector refinement range in a horizontal direction and in a vertical direction.

In an embodiment form of the method according to any preceding implementation or the first aspect as such, a set of sample positions is obtained through a regular decimation of a set of candidate sample positions. The method improves the compression efficiency when compared to a method that does not use any decimation.

In an embodiment form of the method according to any preceding implementation or the first aspect as such, sample positions on alternate rows in the set of candidate sample positions are chosen as the set of sample positions. This increases the speed of the method and reduces the storage requirements.

In an embodiment form of the method according to any preceding implementation or the first aspect as such, a zipper pattern of positions of interpolated samples in the set of candidate sample positions are chosen as the set of sample positions. For example, even parity rows may produce first predicted samples at a pre-determined number of contiguous sample positions that are left (or right) justified, and odd parity rows may produce predicted samples at the pre-determined number of contiguous sample positions that are right (or left) justified.

In an embodiment form of the method according to any preceding implementation or the first aspect as such, the initial motion vector is a first motion vector or a second motion vector, and the first motion vector and the second motion vector correspond to a different reference picture list.

According to a second aspect, the present disclosure provides an encoder comprising processing circuitry for carrying out the method according to the first aspect as such or any preceding implementation.

According to a third aspect, the present disclosure provides a decoder comprising processing circuitry for carrying out the method according to the first aspect as such or any preceding implementation.

According to a fourth aspect, the present disclosure provides a computer program product comprising a program code for performing the method according to the first aspect as such or any preceding implementation.

According to a fifth aspect, the disclosure provides a decoder, comprising: one or more processors; and a non-transitory computer-readable storage medium coupled to the processors and storing programming for execution by the processors, wherein the programming, when executed by the processors, configures the decoder to carry out the method according to the first aspect as such or any preceding implementation.

According to a sixth aspect, the present disclosure provides an encoder, comprising: one or more processors; and a non-transitory computer-readable storage medium coupled to the processors and storing programming for execution by the processors, wherein the programming, when executed by the processors, configures the encoder to carry out the method according to the first aspect as such or any preceding implementation.

According to a seventh aspect, the present disclosure provides a device comprising motion vector refinement means configured to obtain an initial motion vector and a reference picture for bi-prediction; obtain sets of candidate sample positions in the reference picture according to the initial motion vector and candidate motion vectors, wherein each candidate motion vector is derived by the initial motion vector and each preset motion vector offset, and wherein each set of candidate sample positions corresponds to each candidate motion vector; obtain each set of sample positions from each set of candidate sample positions; compute a matching cost for each candidate motion vector within each set of sample positions; obtain a refined motion vector based on the computed matching cost of each candidate motion vector; and obtain prediction values for a current block based on the refined motion vector. Thus, the device and in particular the motion vector refinement means is configured to carry out the method operations of the method according to the first aspect.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
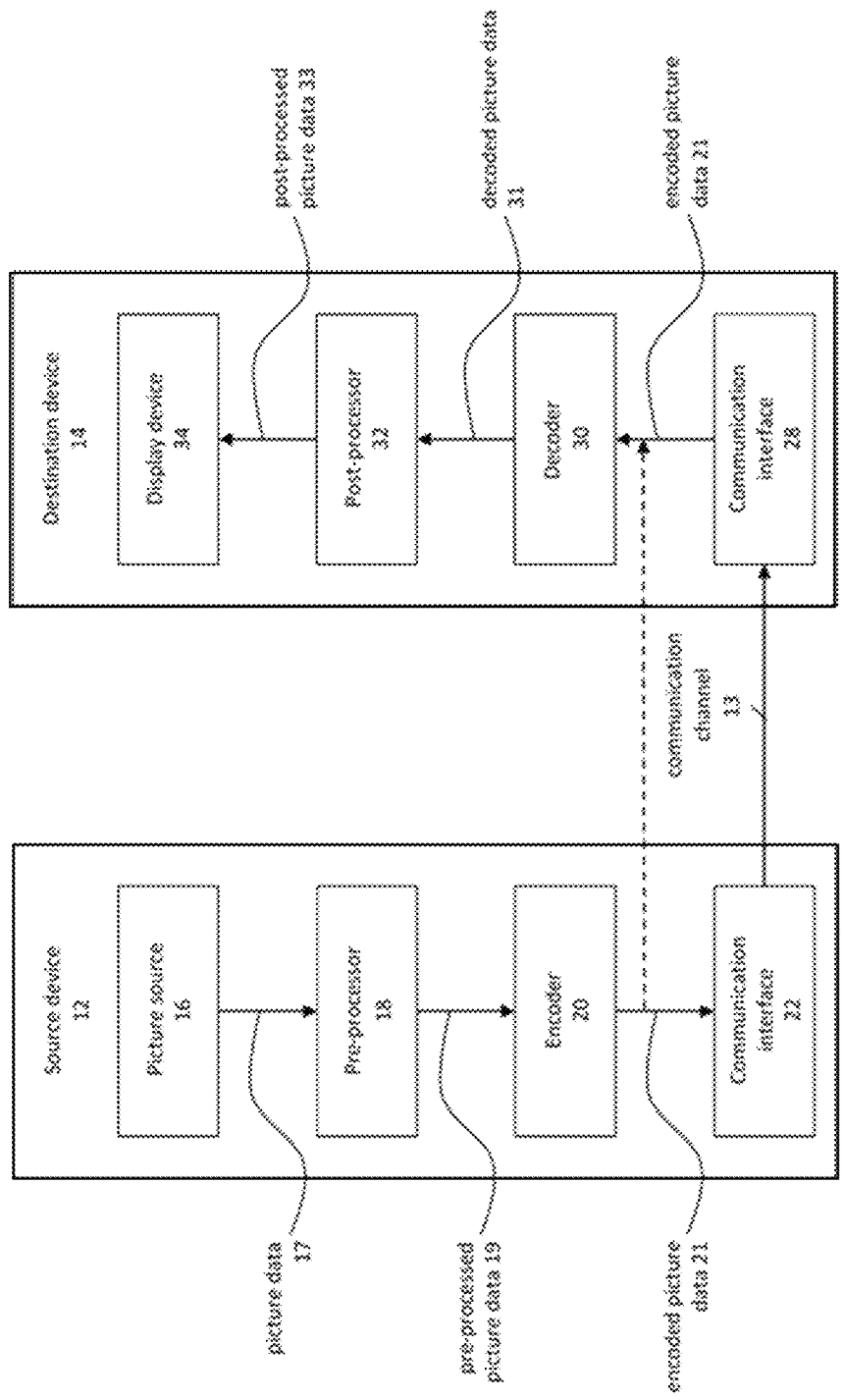
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. in an embodiment, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. in an embodiment, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
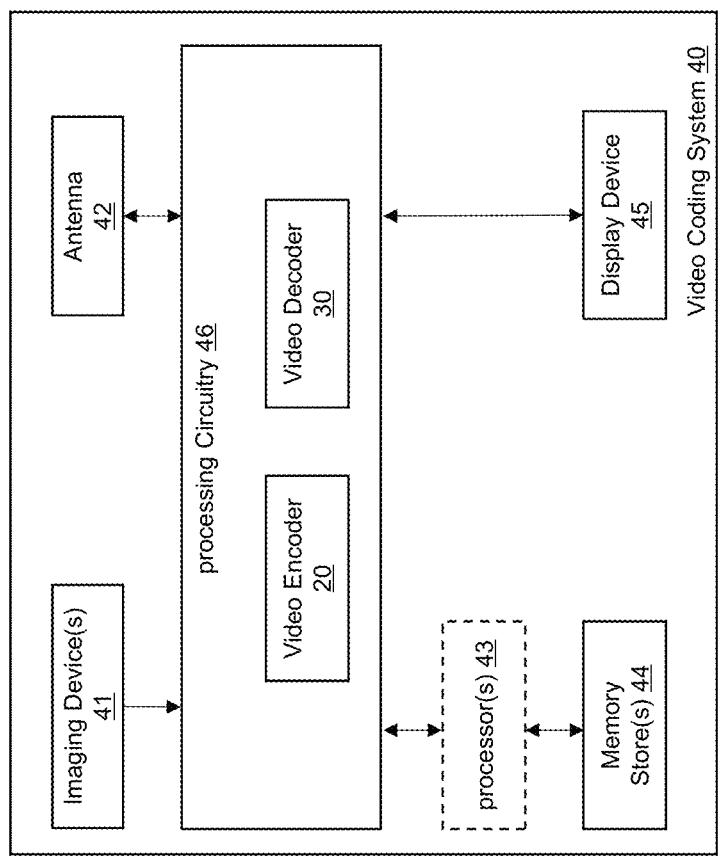
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
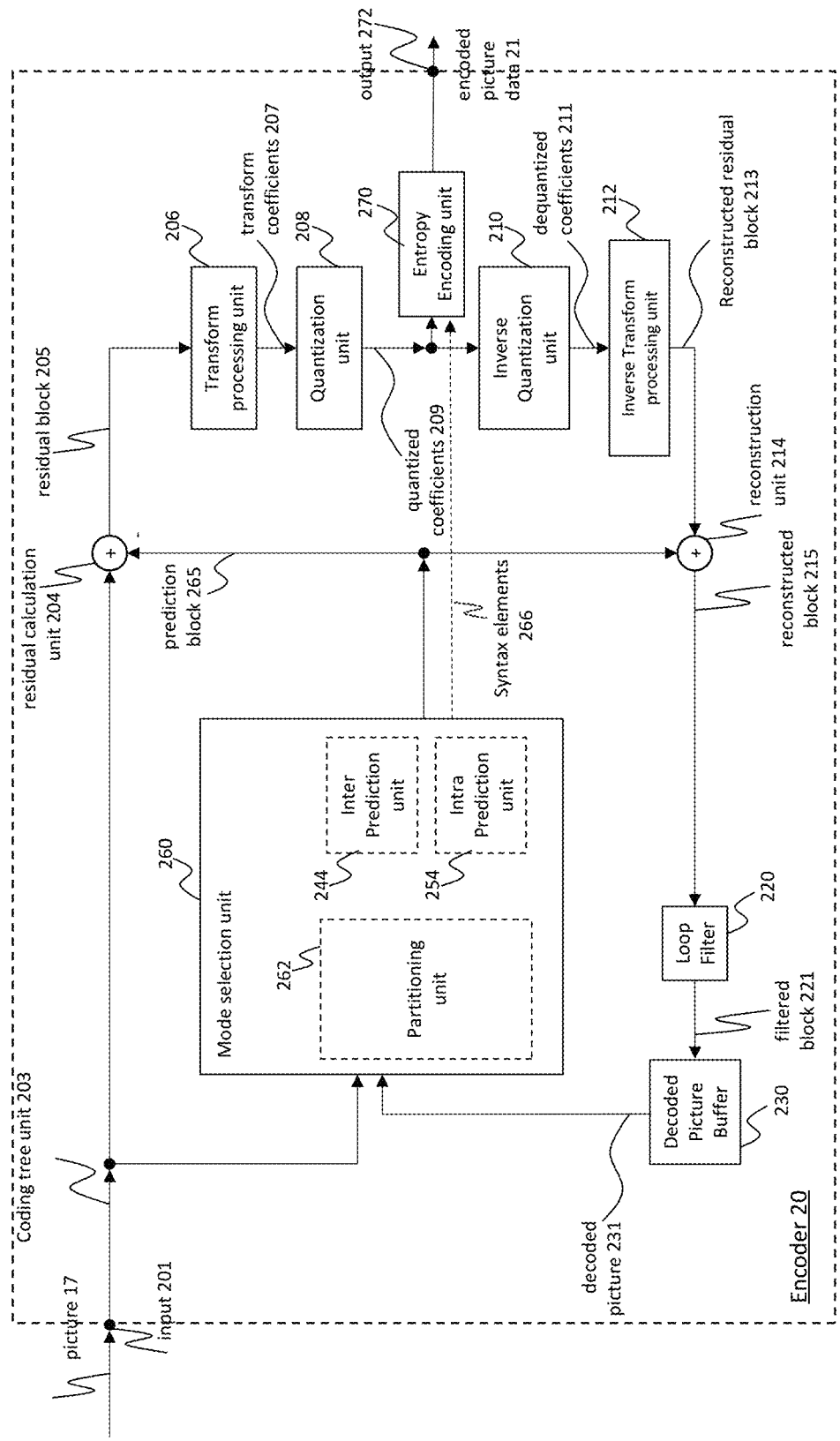
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
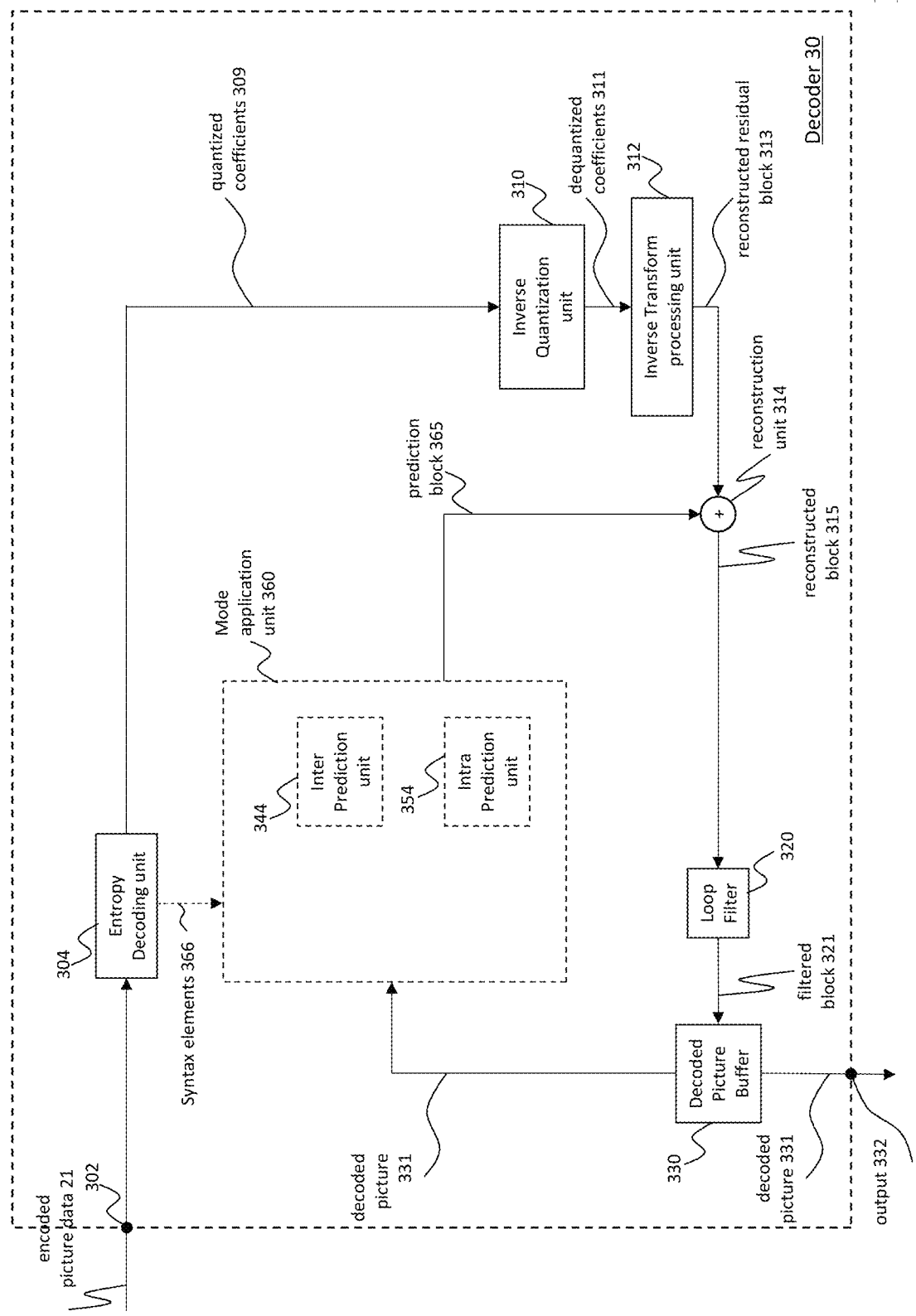
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g.

directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In some embodiments, such as in the draft VVC standard, in order to facilitate a processing pipeline in hardware with limited internal memory compared to the CTU, a virtual pipeline data unit (VPDU) is defined. A VPDU is a virtual partitioning of a CTU into uniform sub-blocks of luminance samples and corresponding chrominance samples with a processing order across the partitions within the CTU in such a manner that the processing of a given VPDU does not depend on the processing of any other future VPDU in the processing order. However, certain syntax elements can still be signaled in the bitstream at the CTU level and shall apply for all VPDUs in that CTU. Certain constraints to partitioning may be imposed to ensure that a coding unit completely spans one or more VPDUs, but cannot partially cover a VPDU.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.
Prediction The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$i. ux = (mvx + 2^{bitDepth}) \% 2^{bitDepth} \quad (1)$$

$$ii. mvx = (ux >= 2^{bitDepth-1}) ? (ux - 2^{bitDepth}) : uc \quad (2)$$

$$iii. uy = (mvy + 2^{bitDepth}) \% 2^{bitDepth} \quad (3)$$

$$b. mvy = (uy >= 2^{bitDepth-1}) ? (uy - 2^{bitDepth}) : uy \quad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$a. ux = (mvpx + mvdx + 2^{bitDepth}) \% 2^{bitDepth} \quad (5)$$

$$ii. mvx = (ux >= 2^{bitDepth-1}) ? (ux - 2^{bitDepth}) : ux \quad (6)$$

iii. $uy = (mvpy + mvdy + 2^{bitDepth}) \% 2^{bitDepth}$ (7)

iv. $mvy = (uy >= 2^{bitDepth-1}) ? (uy - 2^{bitDepth}) : uy$ (8)

The operations may be applied during the sum of mvp and mvd, as shown in formula (5) to (8).

Method 2: remove the overflow MSB by clipping the value
1. vx=Clip3($-2^{bitDepth-1}$, $2^{bitDepth-1}-1$, vx)
2. vy=Clip3($-2^{bitDepth-1}$, $2^{bitDepth-1}-1$, vy)

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases} \quad \text{i.}$$

Figure 4:
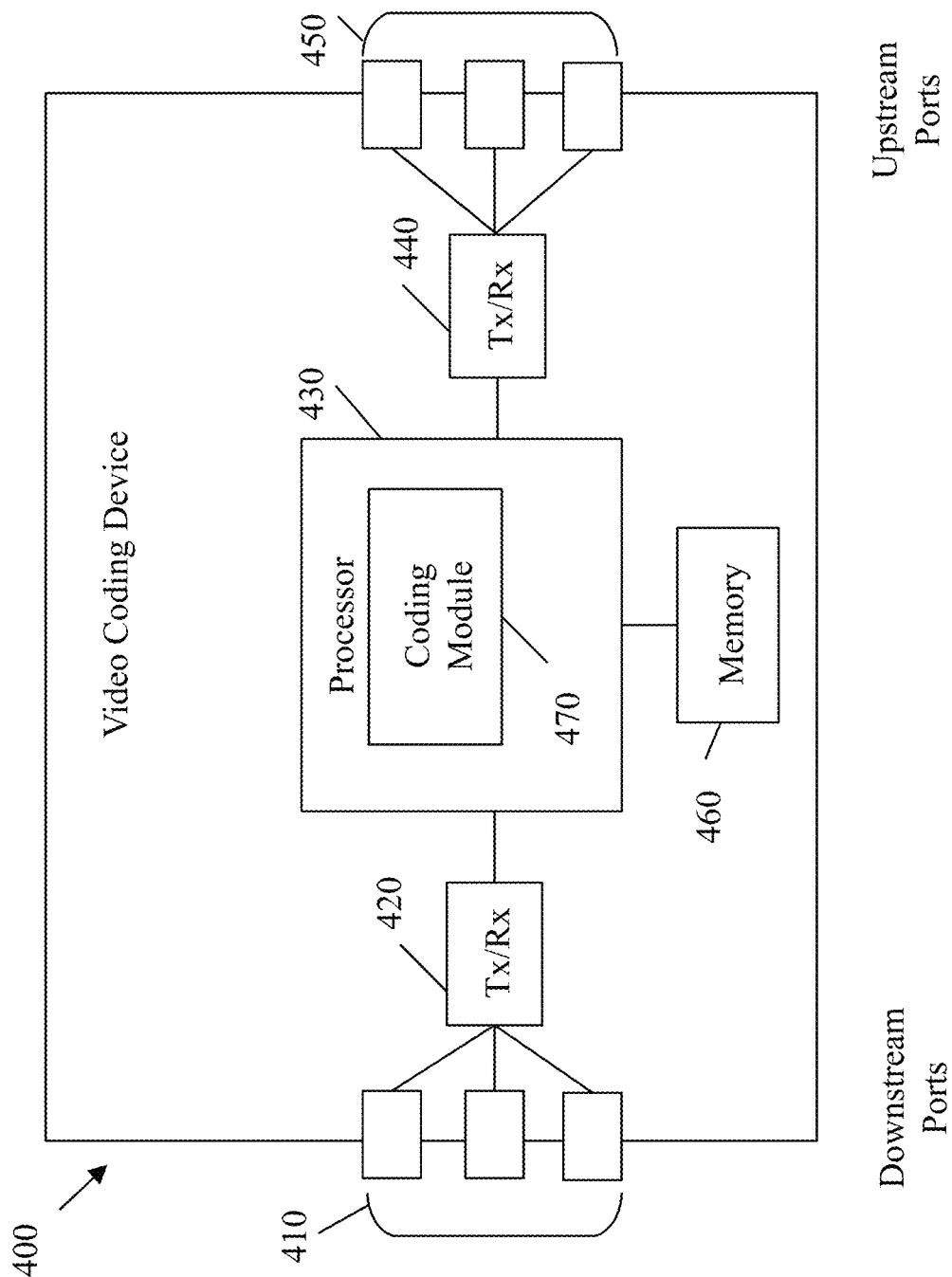
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
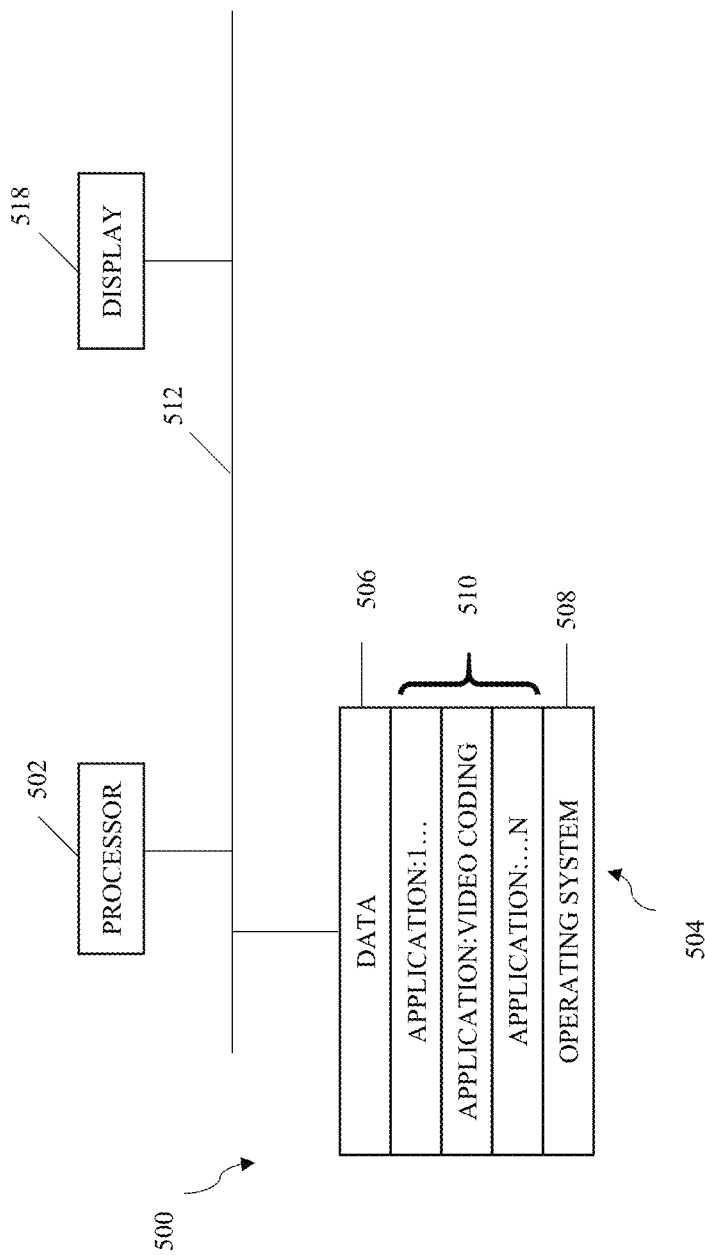
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Motion Vector Refinement (MVR)

Motion vectors are usually at least partially determined at the encoder side and signaled to the decoder within the coded bitstream. However, the motion vectors may also be refined at the decoder (and also at the encoder) starting from initial motion vectors indicated in the bitstream. In such case, for instance, similarity between the patches of already decoded pixels pointed by the initial motion vectors may be used to improve the accuracy of the initial motion vectors. Such motion refinement provides an advantage of reducing the signaling overhead: the accuracy of the initial motion is improved in the same way at both the encoder and the decoder and thus, no additional signaling for the refinement is needed.

It is noted that the initial motion vectors before refinement might not be the best motion vectors that result in the best prediction. Since the initial motion vectors are signaled in the bitstream, it might not be possible to represent the initial motion vector with very high accuracy (which would increase the bitrate), therefore the motion vector refinement process is utilized to improve the initial motion vector. Initial motion vectors might, for instance, be the motion vectors that are used in the prediction of a neighbor block of a current block. In this case it is enough to signal an indication in the bitstream, indicating motion vectors of which neighbor block is used by the current block. Such a prediction mechanism is very efficient in reducing the number of bits to represent the initial motion vectors. However the accuracy of the initial motion vectors might be low, since in general the motion vectors of two neighboring blocks are not expected to be identical.

In order to further improve the accuracy of motion vectors without further increase in signaling overhead, it may be beneficial to further refine the motion vectors derived at the encoder side and provided (signaled) in the bitstream. The motion vector refinement may be performed at the decoder without assistance from the encoder. The encoder in its decoder loop may employ the same refinement to obtain corresponding refined motion vectors as would be available at the decoder. The refinement for a current block that is being reconstructed in a current picture is performed by determining a template of reconstructed samples, determining a search space around the initial motion information for the current block and finding in the search space a reference picture portion best matching the template. The best matching portion determines the refined motion vectors for the current block which is then used to obtain the Inter-predicted samples for the current block, i.e. the current block being reconstructed.

Motion vector refinement is a part of Inter Prediction Unit (244) in FIGS. 2 and 344 in FIG. 3.

The motion vector refinement may be performed according to the following operations:

Typically, an initial motion vectors can be determined based on an indication in the bitstream. For example, an index might be signaled in the bitstream which indicates a position in a list of candidate motion vectors. In another example, a motion vector predictor index and motion vector difference value can be signaled in the bitstream. Motion vectors that are determined based on an indication in the bitstream are defined to be initial motion vectors. In the case of bi-prediction, where the inter-prediction for the current block is obtained as a weighted combination of the predicted block of samples which are determined according to two motion vectors, let the initial motion vector in a first reference picture in list L0 be denoted as MV0; and the initial motion vector in the second reference picture in list L1 be denoted as MV1.

Using the initial motion vectors, refinement candidate motion vector (MV) pairs are determined. At least, two refinement candidate pairs need to be determined. Typically, the refinement candidate motion vector pairs are determined based on the initial motion vector pair (MV0, MV1). Furthermore, the candidate MV pairs are determined by adding small motion vector differences to MV0 and MV1. For example, the candidate MV pairs might include the following:

(MV0, MV1)
(MV0+(0,1), MV1+(0,−1))
(MV0+(1,0), MV1+(−1,0))
(MV0+(0,−1), MV1+(0,1))
(MV0+(−1,0), MV1+(1,0))
. . .

Where (1,−1) denotes a vector that has a displacement of 1 in the horizontal (or x) direction and a displacement of −1 in the vertical (or y) direction.

It is noted that the above list of candidate pairs are just examples for explanation and the disclosure is not limited to a list of candidates.

Refinement candidate motion vector (MV) pairs form the search space of the motion vector refinement process.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

In motion vector refinement, the two prediction blocks obtained using the respective first motion vector and the second motion vector of a candidate MV pair are compared based on a similarity metric for each of the refinement candidate MV pairs. A candidate MV pair resulting in the highest similarity is usually selected as the refined motion vectors. Denoted as MV0' and MV1', refined motion vector in a first reference picture in list L0 and refined motion vector in a second reference picture in list L1 respectively. In other words, predictions are obtained corresponding to list L0 motion vector and list L1 motion vector of the candidate motion vector pair, which are then compared based on a similarity metric. The candidate motion vector pair that has the highest associated similarity is selected as refined MV pair.

Typically the output of the refinement process are refined MVs. The refined MVs might be same as the initial MVs or might be different with the initial MVs, depending on which candidate MV pair achieves the highest similarity, the candidate MV pair formed by initial MVs are also among the MV pair candidates. In other words, if the highest candidate MV pair that achieves the highest similarity is formed by the initial MVs, the refined MVs and initial MVs are equal to each other.

Instead of selecting the position that maximizes a similarity metric, another method is select a position that minimizes a dis-similarity metric. The dis-similarity comparison measure might be SAD (Sum of absolute differences), MRSAD (mean removed sum of absolute differences, SSE (Sum of Squared Error) etc. The SAD between two prediction blocks may be obtained using a candidate MV pair (CMV0, CMV1), the SAD can be computed as follows:

$$SAD(CMV0, CMV1) = \Sigma_{x=0}^{nCbW-1} \Sigma_{y=0}^{nCbH-1} \text{abs}(predSamplesL0[x][y] - predSamplesL1[x][y])$$

where nCbH and nCbW are height and the width of the prediction blocks, the function abs(a) specifies the absolute value of the argument a, predSAmplesL0 and predSAmplesL1 are prediction block samples obtained according to candidate MV pair which is denoted by (CMV0, CMV1).

Alternatively, the dis-similarity comparison measures can be obtained by evaluating only a subset of samples in a prediction block, in order to reduce the number of computations. An example is below, where rows of samples are alternatively included in the SAD calculation (every second row is evaluated).

$$SAD(CMV0, CMV1) = \sum_{x=0}^{nCbW-1} \sum_{y=0}^{nCbH/2-1} \text{abs}(pred\text{Samples}L0[x][2*y] - pred\text{Samples}L1[x][2*y])$$

One example of motion vector refinement is explained in the document JVET-M1001-v3, "Versatile Video Coding (Draft 4)" of JVET (of ITU-T SG 16 WP 3 and ISO/IEC JTC 1/SC 29/WG 11) which is publicly available under http://phenix.it-sudparis.eu/jvet/". The section "8.4.3 Decoder side motion vector refinement process" in the document exemplifies the motion vector refinement.

In order to reduce internal memory requirements for refinement, in some embodiments, the motion vector refinement process may be performed independently on blocks of luma samples obtained by partitioning coded block of samples that exceed a certain pre-determined width or pre-determined height in luma samples into sub-blocks of samples that are less than or equal to the pre-determined width and pre-determined height in luma. The refined MV pair for each sub-block within a partitioned coded block can be different. Inter-prediction for both luma and chroma are then performed for each sub-block using the refined MV pair of that sub-block.

Given max_sb_width and max_sb_height indicating the maximum allowed subblock width and height respectively, a current coding unit of size cbWidth×cbHeight that is eligible for applying MVR is typically partitioned into a number of sub-blocks numSbs each of size sbWidth× sbHeight as follows:

numSbs=numSbX*numSbY, numSbX=(cbWidth>max_sb_width)?(cbWidth/ max_sb_width):1 numSbY=(cbHeight>max_sb_height)?(cbHeight/ max_sb_height):1 sbWidth=(cbWidth>max_sb_width)?max_sb_width: cbWidth sbHeight=(cbHeight>max_sb_height) ?max_sb_height:cbHeight Each MV of the initial MV pair can have a fractional pixel precision. In other words, the MV indicates a displacement between a current block of samples and a re-sampled reference region and this displacement can point to a fractional position in the horizontal and vertical directions from the integer grid of reconstructed reference samples. Typically, a 2-dimensional interpolation of the reconstructed reference integer sample grid values is performed to obtain the sample values at the fractional sample offset location. The process of obtaining predicted samples from the reconstructed reference pictures using a candidate MV pair can be through one of the following methods:

Round the fractional part of the initial MV pair to the nearest integer location and obtain the integer grid values of the reconstructed reference pictures.

Perform a 2-tap (e.g. bilinear) separable bilinear interpolation to obtain the predicted sample values at the fractional pixel accuracy indicated by the initial MV pair.

Perform a higher tap (e.g. 8-tap or 6-tap) separable interpolation to obtain the predicted sample values at the fractional pixel accuracy indicated by the initial MV pair.

While the candidate MV pairs can have arbitrary sub-pixel offset with respect to the initial MV pair, in some embodiments, for the sake of simplicity of search, the candidate MV pairs are chosen with integer pixel distance with respect to the initial MV pair. In such cases, the predicted samples across all the candidate MV pair can be obtained by performing a prediction for a block of samples around the initial MV pair to cover all the refinement positions around the initial MV pair.

In some embodiments, once the dis-similarity cost value at all the candidate MV pairs at an integer distance from the initial MV pair have been evaluated, additional candidate MV pairs at sub-pixel distance offsets from the best cost value position are added. Predicted samples are obtained for each of these positions using one of the methods described earlier and the dis-similarity costs are evaluated and compared to obtain the lowest dis-similarity position. In certain other embodiments, to avoid this computationally expensive prediction process for each sub-pixel distance position around the best cost integer-distance position, the integer-distance cost values evaluated are remembered and a parametric error surface is fitted in the vicinity of the best integer-distance position. The minimum of this error surface is then analytically computed and used as the position with the minimum dis-similarity. In such cases, the dis-similarity cost value is said to be derived from the computed integer-distance cost values.

The application of motion vector refinement for a given coded block of samples can be conditioned on certain coding properties of the coded block of samples. Some examples of such coding properties can be:

The distance in number of pictures (when sampled at a uniform frame-rate) from the current picture to the two reference pictures used for bi-prediction of the coded block of samples are equal and fall on opposite sides of the current picture.

The initial dis-similarity between the two predicted blocks obtained using the initial MV pair is less than a pre-determined per-sample threshold.

Bi-Predictive Optical Flow Refinement

Bi-predictive optical flow refinement is a process of improving the accuracy of bi-prediction of a block without explicitly signaling anything in the bitstream other than what is commonly signaled for bi-prediction. It is a part of Inter Prediction Unit (244) in FIGS. 2 and 344 in FIG. 3.

In bi-prediction, 2 inter-predictions are obtained according to two motion vectors, after which the predictions are combined by application of weighted averaging. The combined prediction can result in a reduced residual energy as the quantization noise in the two reference patches get canceled out, thereby providing more coding efficiency compared to uni-prediction. Weighted combination in bi-prediction can be performed by an equation:

Bi-prediction=Prediction1*W1+Prediction2*W2+K, where W1 and W2 are weighting factors that might be signalled or might be predefined. K is an additive factor which might also be signalled or be predefined. As an example, bi-prediction might be obtained using Bi-prediction=(Prediction1+Prediction2)/2, where W1 and W2 are set to ½ and K is set to 0.

The goal of optical flow refinement is to improve the accuracy of the bi-prediction. Optical flow is the pattern of apparent motion of image objects between two consecutive frames caused by the movement of object or camera. Optical flow refinement process improves the accuracy of the bi-prediction by application of optical flow equation (solving of optical flow equation).

Consider a pixel I (x,y,t) in first frame (x and y corresponding to spatial coordinates, t corresponding to time dimension). It moves by distance (dx,dy) in next frame taken after dt time. Since those pixels are the same and intensity does not change, the optical flow equation is given by:

$I(x,y,t)=I(x+v_x,y+v_y,t+dt)$

I(x,y,t) specifies the intensity (sample value) of a pixel at the coordinates of (x,y,t).

Assuming small displacements and that higher order terms in a Taylor series expansion can be ignored, the optical flow equations can also be written as:

$$\frac{\partial I}{\partial t} + v_x \frac{\partial I}{\partial x} + v_y \frac{\partial I}{\partial y} = 0$$

Where $$\frac{\partial I}{\partial x} \text{ and } \frac{\partial I}{\partial y}$$

are the horizontal and vertical spatial sample gradients at position (x,y) and $$\frac{\partial I}{\partial t}$$

is the partial temporal derivative at (x,y).

The optical flow refinement utilizes the principle above in order to improve the quality of bi-prediction.

An embodiment of optical flow refinement typically includes the operations of:
1. Calculating sample gradients
2. Calculating difference between first prediction and second prediction
3. Calculating displacement of pixels or group of pixels that minimizes the error $\Delta$ between the two reference patches obtained using the optical flow equation.

$$\Delta = (I^{(0)} - I^{(1)}) + v_x \left( \tau_0 \frac{\partial I^{(0)}}{\partial x} + \tau_1 \frac{\partial I^{(1)}}{\partial x} \right) + v_y \left( \tau_0 \frac{\partial I^{(0)}}{\partial y} + \tau_1 \frac{\partial I^{(1)}}{\partial y} \right)$$

where $I^{(0)}$ corresponds to sample value in first prediction, $I^{(1)}$ is the sample value in second prediction, $v_x$ and $v_y$ are the displacements calculated in $-x$ and $-y$ direction, and $\propto I^{(0)}/\propto x$ and $\propto I^{(0)}/\propto_y$ are the gradients in $-x$ and $-y$ directions. $\tau_1$ and $\tau_0$ denote the distances to the reference pictures, where the first prediction and second prediction are obtained. Some approaches minimize the sum of squared errors while some approaches minimize the sum of absolute error. A patch of samples around a given position (x,y) are utilized for solving the minimization problem.

4. employing an embodiment of the optical flow equation, such as below:

pred$_{BIO}$=½·($I^{(0)}$+$I^{(1)}$+$v_x$1·($\tau_1 \propto I^{(1)}/\propto x - \tau_0 \propto I^{(0)}/\propto x$)+
$v_y$1·($\tau_1 \propto I^{(1)}/\propto y - \tau_0 \propto I^{(0)}$), Where pred$_{BIO}$ specifies the modified prediction which is the output of the optical flow refinement process.

Sample gradients can be obtained by the following formula $\propto I(x,y,t)/\propto x = I(x+1,y,t) - I(x-1,y,t)$ $\propto I(x,y,t)/\propto y = I(x,y+1,t) - I(x,y-1,t)$ In some embodiments, in order to simplify the complexity of estimating the displacement for each pixel, the displacement is estimated for a group of pixels. In some examples, to compute the improved bi-prediction for a block of 4×4 luma samples, the displacements are estimated using sample values of a block of 8×8 luma samples with the 4×4 block of samples at its center.

The input of optical flow refinement process are the prediction samples from two reference pictures and the output of the optical flow refinement is combined prediction (predBIO) which is calculated according to optical flow equation.

One example of motion vector refinement is explained in the 8.4.7.4 "Bidirectional optical flow prediction process" section of the document JVET-M1001, Versatile Video Coding (Draft 4).

Some methods that use a decimated set of predicted samples to compute matching costs during the motion vector refinement process, these methods perform a first prediction to obtain predicted samples for all positions in a search or refinement area. Then for candidate blocks corresponding to a candidate MV pair, the matching cost is evaluated using a decimated set of samples within the candidate blocks. While the decimated matching cost evaluation reduces the complexity of the matching cost computations, there is no reduction in the complexity associated with generating predicted sample values using an M-tap filter. The complexity of DMVR is influenced by both the prediction process to obtain predicted sample values for the refinement and the matching cost evaluations. For a one-sided vertical refinement range of Sy, at least (2*Sy+1) line-buffers of predicted sample values need to be maintained for performing the cost calculations for all search positions. Each line buffer has a width of (sbWidth+2*Sx) samples, where Sx is the one-sided horizontal refinement range.

Some methods attempt to decimate the predicted sample positions in the vertical direction by decimating the candidate search positions in the vertical direction, such that all candidate search positions falls on even vertical offsets. This process has adverse effect on the compression efficiency achieved by MVR. Though, a parametric error surface is used to obtain a minimum matching cost position in the vertical direction between these even vertical offset positions, the compression efficiency loss when compared to using all candidate search positions is still high.

Hence, there is a need for a method that can reduce the complexity of the prediction process and also can reduce the line buffer needs. The method also should impact the compression efficiency gains minimally when compared to a method that does not use any decimation. The present disclosure reduces the complexity associated with the prediction process and also reduces the line buffer memory needs by producing only prediction sample values at a decimated set of positions.

The embodiments of the present disclosure produce a set of first prediction sample values at a decimated set of positions within a refinement/search area during the motion vector refinement process for obtaining refined motion vector for inter-biprediction of a current sub-block within a current coding unit in a current picture. The matching cost evaluations corresponding to different candidate MV pairs, offsets around an initial MV pair are then performed using the predicted sample values at the decimated set of positions within the search area.

In one exemplary embodiment of the disclosure, the set of decimated positions within the search area correspond to alternate rows of sample positions within the search area. When computing matching costs for candidate MV pairs with an even vertical MV offset value, the corresponding candidate block of predicted samples in each reference is identified. The decimated set of positions at which predicted sample values are computed will then fall on a given parity (odd or even) within the candidate blocks. When computing matching costs for candidate MV pairs with odd vertical MV offset value, the opposite parity rows within the candidate blocks will be used. With such an arrangement for matching cost evaluation, the predicted sample values of half the number of rows in the search area are required for the matching cost evaluations independent of the vertical MV offset value. The method leverages the fact that offsets in one reference are reflected (i.e. equal in magnitude, but opposite in sign) in the other reference. Hence, even though the decimated candidate block for an odd vertical MV offset may be identical to an even vertical MV offset in one reference, the corresponding blocks in the other reference will not be identical. Hence, the decimated matching costs evaluated for the even and odd vertical MV offsets are useful for performing the refinement while avoiding the computation of prediction sample values at half the number of rows in the search area.

In certain embodiments, an extended set of predicted samples are generated around the chosen search area. These extended set of predicted samples are used in the matching cost evaluations. The samples within this extended search area are also produced for a decimated set of positions, and the matching cost evaluations use an extended block (i.e. a block that has more samples than the number of samples in a current sub-block within a current coding block).

The embodiments of the disclosure could reduce the complexity associated with generating predicted samples used for computing matching cost values. Some embodiments could reduce the matching cost complexity, while having a minimal impact on coding efficiency.

Let a current sub-block in a current coding unit in a current picture that is eligible for decoder-side motion vector refinement have a luma width as sbWidth and luma height as sbHeight. According to a first exemplary embodiment of the disclosure, the operations for inter-bi prediction of the current coding block comprises the following operations:

Operation-0: Obtaining an initial MV pair (MV0, MV1) with respect to a pair of reference pictures as the starting point for refinement.

Operation-1: Obtaining a first set of candidate sample positions in each reference picture, wherein the first set of candidate sample positions fall within a bounding rectangular region that is computed using the initial MV pair (MV0, MV1), the top-left position of the current sub-block in the current picture (x,y), a one-sided motion vector refinement range Sx in the horizontal direction, and a one-sided motion vector refinement range Sy in the vertical direction.

Operation-2: Performing a first prediction using initial MV pair (MV0, MV1) and the reconstructed reference luma samples of the pair of reference pictures, to obtain predicted sample values at a subset of positions within the first set of candidate sample positions, wherein the subset of sample positions are obtained through a regular decimation of the first set of candidate sample positions.

Operation-3: For each candidate MV pair (CMV0, CMV1) within the MV refinement range,
determining a rectangular region within the first set of candidate sample positions in each reference, based on the MV offset between the candidate MV and the initial MV in each reference;
computing a matching cost value using the obtained subset of predicted sample values in each reference that fall within the determined rectangular region for that reference.

Operation-4: Determining a refined MV pair (MV0', MV1') for the sub-block based on the computed matching cost values.

Operation-5: Performing a second inter-prediction based on the refined MV pair (MV0', MV1'), to obtain second predicted samples from each reconstructed reference picture, and performing bi-prediction using these second predicted samples.

In one embodiment, explanation of the operations are as follows:

In Operation 0, two initial motion vectors is obtained as input. The initial motion vectors can be determined based on an indication information in the bitstream. For example, an index might be signaled in the bitstream, the index indicates a position in a list of candidate motion vectors. In another example, a motion vector predictor index and motion vector difference value can be signaled in the bitstream. The motion vector that is determined based on an indication information in the bitstream is defined as the initial motion vectors.

In another example, reference picture indications can be obtained from the bitstream, the initial motion vectors are obtained based on the reference picture indications. The reference picture indications are used to determine the reference pictures that are pointed by the initial motion vectors.

Operations 1 through Operation 4 correspond to motion vector refinement process as explained in the above examples. The initial motion vectors are refined according to motion vector refinement. In one example, the matching cost is the dis-similarity measure that is used in the motion vector refinement process.

In operation 1, given the one-sided refinement range in the horizontal direction Sx and vertical direction Sy, the top-left luma position of the current sub-block within the current picture, and the initial MV pair obtained in operation-0, a rectangular block is determined in the reference pictures. The set of sample positions within this rectangular block form a first set of candidate positions, a first set of predicted samples need to be generated at the first set of candidate positions.

According to operation 2, first predictions are performed corresponding to initial motion vectors at a subset of positions within the first set of predicted samples. In an example, there are at least 2 pairs of candidate motion vectors in the motion vector refinement process, one of which is typically the pair formed by the initial motion vectors (MV0, MV1). In other words, the set of candidate motion vectors typically include more than one pair, wherein one of the pairs is usually (MV0, MV1). The other pair of candidate motion vectors are determined based on (MV0, MV1), by adding small perturbations to the motion vectors (as explained in the above examples).

In Operation 2, the first predictions corresponding to each pair of candidate motion vectors are performed based on an M-tap interpolation filter. As an example, one prediction sample corresponding to MV0 can be obtained for a subset of the first set of candidate sample positions in a reference picture (a picture that is already encoded in the encoder or decoded in the decoder), wherein the block is pointed by MV0. Afterwards, an interpolation filter is applied to the samples within the block pointed by MV0. In order to provide more accurate motion estimation, the resolution of the reference picture may be enhanced by interpolating samples between pixels. Fractional pixel interpolation can be performed by weighted averaging of the closest pixels. Here the M-tap filter might typically be a 24, 6, or 8 tap filter (not limited to these options), meaning that the filter has M multiplication coefficients. The prediction corresponding to MV1 can be obtained similarly using reconstructed reference samples in another reference picture.

Figure 6:
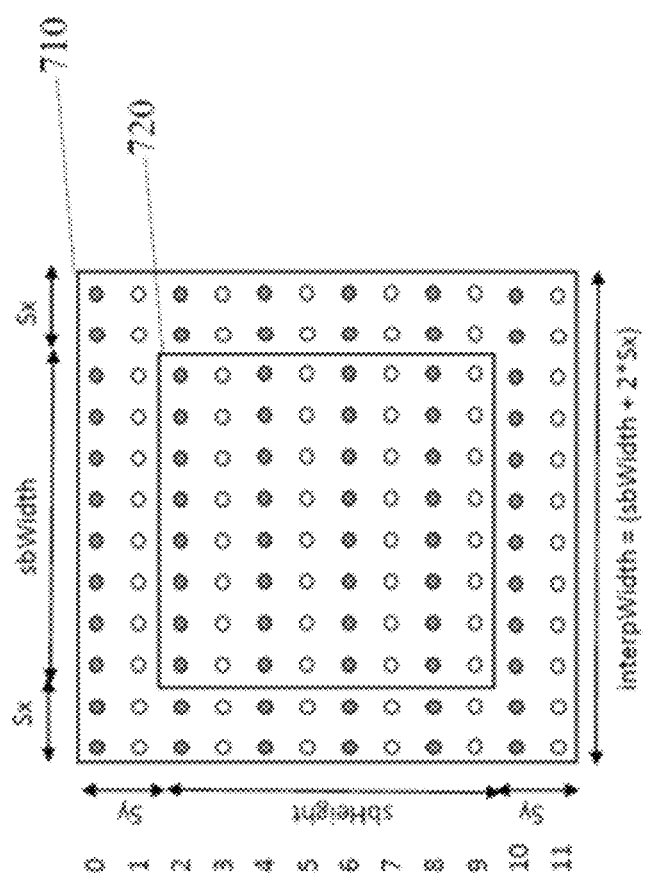
FIG. 6 is an example about Interpolated samples for refinement with example vertical decimation.

In one example, the subset of positions within the first set of candidate sample positions are chosen as sample positions on alternate rows. This is illustrated in FIGS. 6 and 8A. In FIG. 7, no extended samples are used. The circles that are filled correspond to sample positions at which prediction values are obtained. The circles that are not filled correspond to sample positions at which prediction values need not be computed. The dimensions of the rectangular block 710 in this example is (sbWidth+2*Sx)×(sbHeight+2*Sy), wherein the sub-block 720 has the dimension sbWidth×sbHeight. The number of predicted samples produced are half of this value. FIG. 8A illustrates a case where extended samples are used, the horizontal one-sided extension is Ox and the vertical one-sided extension is Oy. The dimensions of the rectangular block in this example is (sbWidth+2*Sx+2*Ox)×(sbHeight+2*Sy+2*Oy). Again, the first predicted sample values at positions that are filled need to be produced, and the other half of the first predicted sample values not need be produced.

In one example, with the regular vertical decimation by a factor of 2 (with or without extended samples) and the interpolation filter using M=2 taps to obtain the predicted sample values at fractional positions, the interpolation filtering process is performed in the following manner.

From the initial MV pair (MV0, MV1), the integer MV part (IMV0, IMV1) and fractional MV parts (FMV0, FMV1) are obtained. In order to obtain the predicted sample value at a fractional position, from the integer grid of reconstructed reference luma sample values in the refinement range in a reference picture, the following operations are applied:

if the fractional position is zero in both dimensions, then the integer sample values are used to obtain the predicted sample values for the search area.

if the fractional position has a non-zero horizontal value fracx and a zero vertical value, then the predicted sample value for each fractional sample position in the search area is obtained as:

a. ((FILTSUMH−fracx)*a+fracx*b+r)>>(FILT_QH), b. where a and b are the integer grid sample values to the left and right of a current fractional sample position, FILTSUMH corresponds to the sum of all filter taps which is usually chosen as a power of 2 and based on the fractional pixel accuracy associated with fracx, r stands for a rounding offset, and FILT_QH corresponds to $\log_2$(FILT_SUMH).

If the fractional position corresponds to a zero horizontal value and a non-zero vertical value fracy, then the predicted sample value for each fractional sample position in the search area is obtained as a. ((FILTSUMV−fracx)*a+fracx*b+r)>>(FILT_QV), b. where a and b are the integer grid sample values above and below a current fractional sample position, FILTSUMV corresponds to the sum of all filter taps which is usually chosen as a power of 2 and based on the fractional pixel accuracy associated with fracy, r stands for a rounding offset, and FILT_QV corresponds to $\log_2$(FILT_SUMV).

If the fractional position corresponds to non-zero values fracx and fracy respectively in the horizontal and vertical directions, then the predicted sample value for each fractional sample position in the search area is obtained as a. ((FILTSUMH−fracx)*(FILTSUMV−fracy)*a+fracx*(FILTSUMV−fracy)*b+(FILTSUMH−fracx)*fracy*c+fracx*fracy*d+r)>>(FILT_QHV), b. Where a, b, c, d are the integer grid sample values to the top-left, top-right, bottom-left, bottom-right respectively of a current fractional sample position, FILTSUMH corresponds to the sum of horizontal filter taps which is usually chosen as a power of 2 and based on the fractional pixel accuracy associated with fracx, FILTSUMH corresponds to the sum of vertical filter taps which is usually chosen as a power of 2 and based on the fractional pixel accuracy associated with fracy, r is a rounding offset, and FILT_QHV=$\log_2$(FILT_SUMV)+$\log_2$(FILT_SUMV).

In the above example, the 2-D separable interpolation in the horizontal and vertical directions is performed without any intermediate rounding and right shifting after the horizontal interpolation. In one example, when the integer sample bit-depth is 10-bits, and the fractional MV accuracies are in $\frac{1}{16}^{th}$ of a pixel position, the fractional MV accuracies are reduced to $\frac{1}{8}^{th}$ of a pixel position before performing the interpolation in order for the intermediate values to stay within unsigned 16-bit range before the right shift.

In another example, the subset of positions within the first set of candidate sample positions are chosen in the following manner. Even parity rows (i.e., rows with even numbered indices) produce first predicted samples at a pre-determined number of contiguous sample positions that are left (or right) justified. Odd parity rows produce predicted samples at the pre-determined number of contiguous sample positions that are right (or left) justified. The pre-determined number of contiguous sample positions is typically chosen to be an even number that is less than the width of the rectangular block. In certain embodiments, the pre-determined number of contiguous sample positions is chosen to be single instruction multiple data friendly (e.g. multiples of 4, 8, 16). This example is illustrated in FIG. 10A. This kind of decimated sample positions are referred to hereafter as zipped pattern decimation.

In operation 3, the matching cost associated with each pair of candidate motion vectors is determined according to the first predictions.

FIGS. 7A, 7B, 8B, 8C, and 10B, 10C provide examples of sample positions from the predicted block of samples in operation-2 that are used in evaluating matching cost for a given candidate MV pair.

Figure 7A:
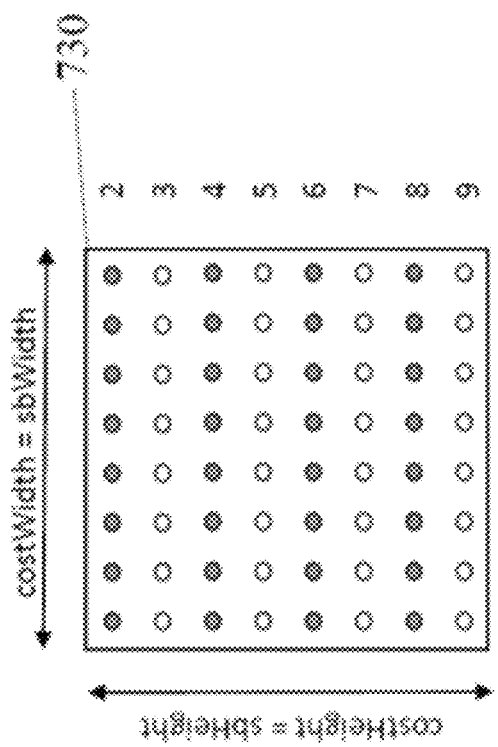
FIG. 7A is an example about Samples used for computing matching cost.
Figure 7B:
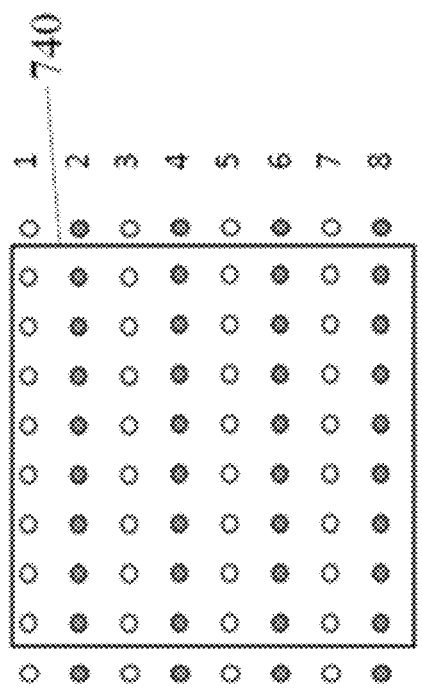
FIG. 7B is another example about Samples used for computing matching cost.
Figure 8A:
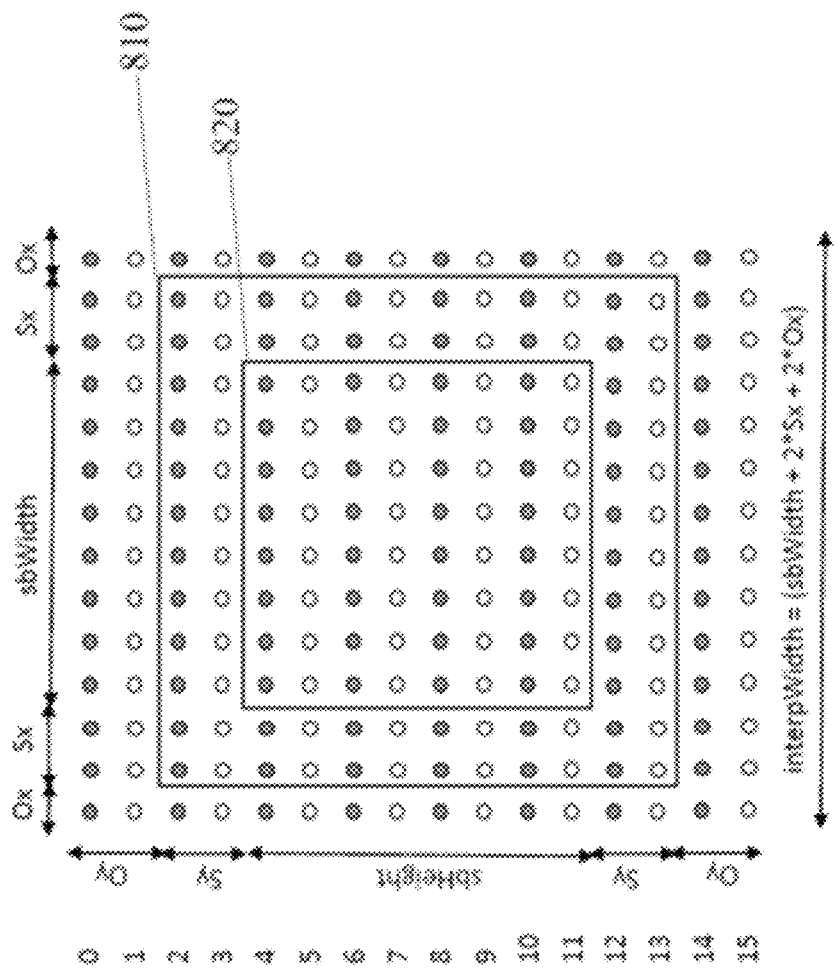
FIG. 8A is another example about Interpolated samples for refinement with example vertical decimation.

The matching cost block dimensions of the cost block 730, 740 in the example of FIGS. 7A, 7B corresponding to no extension and vertical decimation by a factor of 2 is sbWidth×sbHeight, wherein alternate rows of sample positions do not participate in the matching cost evaluation as the predicted sample values are not available at these positions. The sample positions at which sample cost values are available are used for evaluating the matching cost. Hence, the matching cost evaluation uses half of the samples, in the case where the subset of sample positions corresponds to vertical decimation by a factor of 2. This is illustrated in FIGS. 7A and 7B.

Figure 8B:
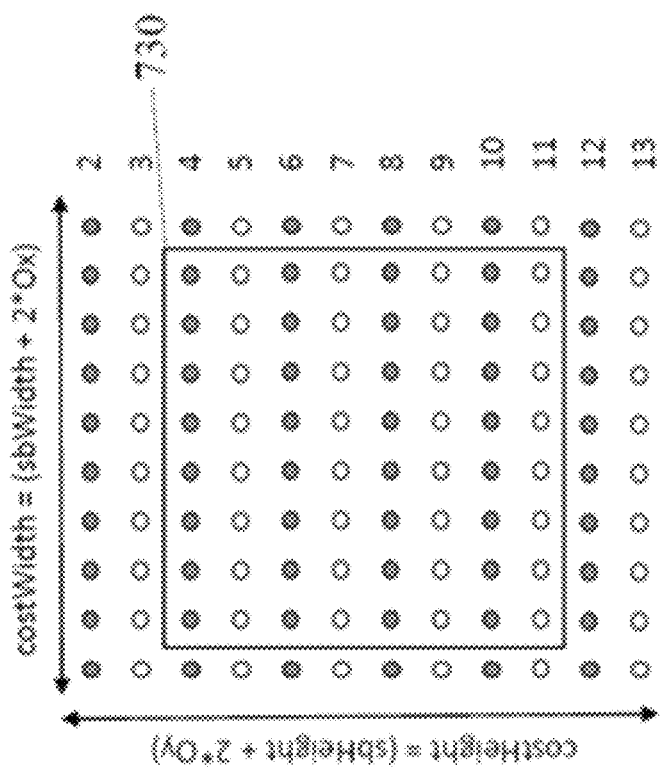
FIG. 8B is an example about Samples used for computing matching cost.
Figure 8C:
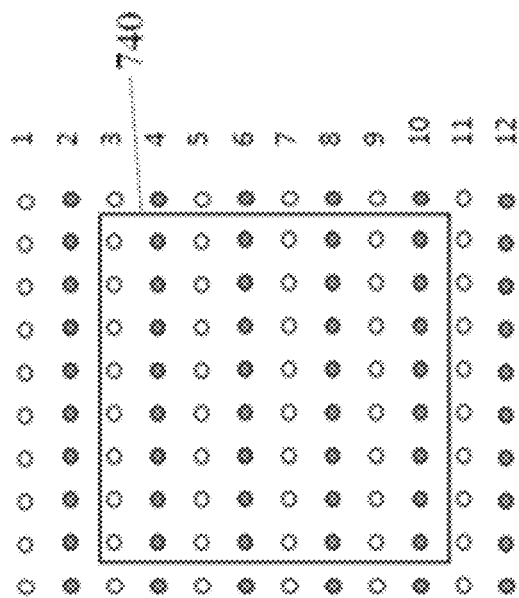
FIG. 8C is another example about Samples used for computing matching cost.
Figure 10:
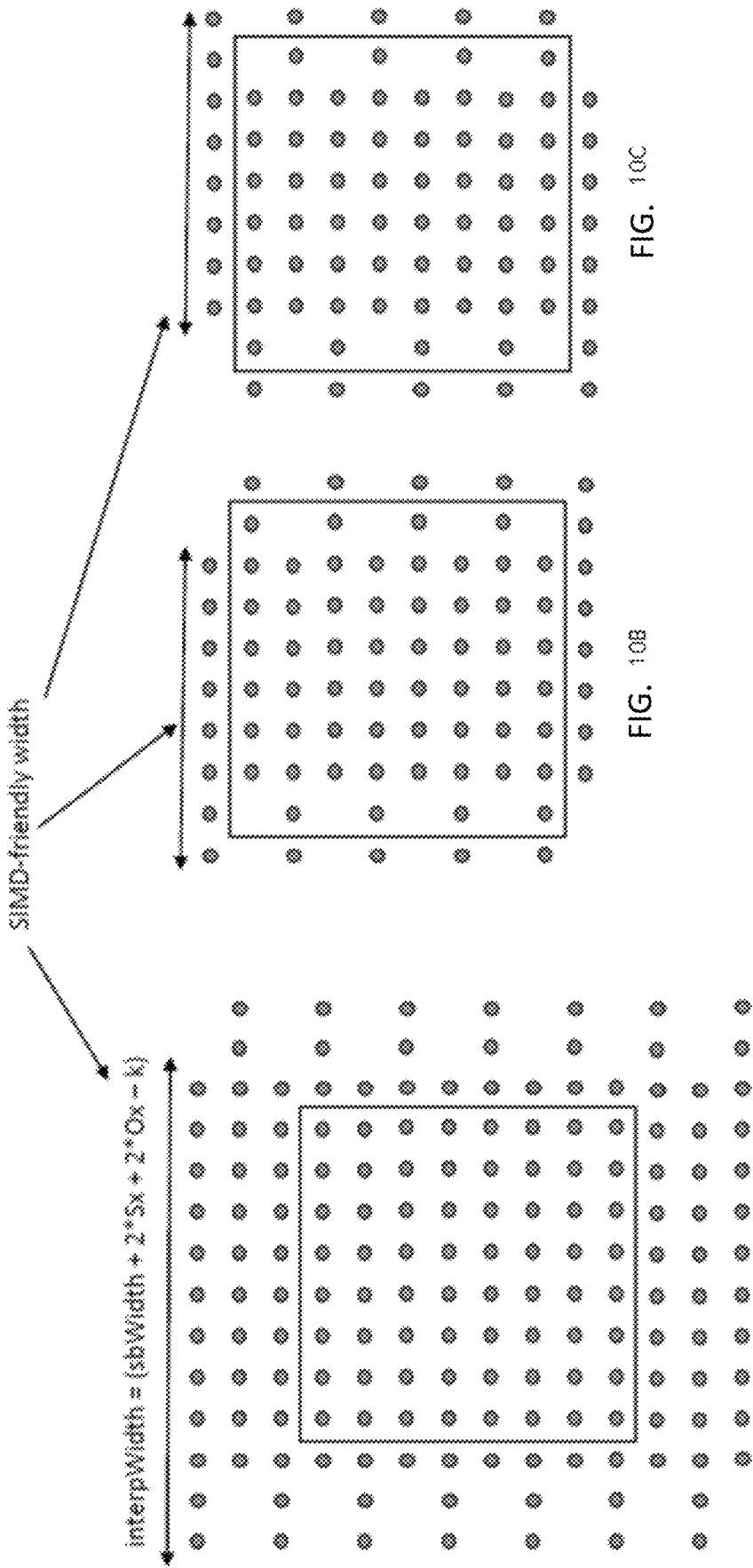
FIG. 10A is an example about Zipped Interpolated samples.
FIG. 10B is an example of samples used for computing overlapped matching cost.
FIG. 10C is an example of samples used for computing overlapped matching cost.

For the case of a search area with extended samples, FIGS. 8B and 8C illustrate the set of sample positions that contribute to the matching cost evaluation for a given candidate MV pair, and illustrating the rectangular block 810 and the sub-block 820. FIGS. 10 B and 10C illustrate a case where the zipped pattern decimation is used, and depicts an additional use case with block extension.

According to the disclosure, in the embodiments shown in FIGS. 8A, 8B, 8C, it is required to consider rows 0,1,2,3, 4,5,6, . . . as the rows of interpolated reference samples. Taking every alternate row for instance results in 0,2,4,6 as shown in the filled pixels in FIG. 8A. FIG. 8A shows interpolated samples for refinement with example decimation by a factor of 2, where filled samples are computed and unfilled samples need not be computed. In the case where the vertical search positions is comprised of even rows, e.g. {2,4,6}, FIG. 8B needs to be considered, which shows samples used for computing matching cost for a candidate MV pair with even vertical displacements. Accordingly the 2 sets in this example need to be {2,4,6} and {6,4,2}. In the case where the vertical search positions is comprised of odd rows, e.g. {3, 5}, FIG. 8C needs to be considered, which shows samples used for computing matching cost for a candidate MV pair with odd vertical displacements. Accordingly the 2 sets in this example are {3,5} and {5,3}.

According to operation 3, at least one matching cost (for example, similarity measure) is obtained corresponding to one of the refinement candidate motion vector (MV) pairs. The higher the similarity between two prediction blocks, the matching cost is smaller.

The matching cost can be measures such as sum of absolute differences, mean-removed sum of absolute differences, and sum of squared differences.

The said matching cost values are used in the refinement of the initial motion vectors in operation 4. In one example, the refined MV pair (MV0', MV1') is selected as the candidate MV pair with the highest similarity (i.e. the least matching cost). In another example, the matching cost values are used to fit a parametric equation to the cost values in the spatial vicinity of the true sub-pixel position accurate refinement motion vector pair. By solving the unknowns of the parametric equation using the positions and evaluated matching cost values, a sub-pixel accurate refined MV pair is determined.

In Operation 5, a second prediction is obtained according to the refined motion vector and a K-tap interpolation filter. In the case of 2 refined motion vectors (MV0' and MV1'), which is the case of bi-prediction, two second predictions are obtained.

The second prediction is obtained by application of a second interpolation filter (K-tap filter), that might or might not be identical to the first interpolation filter (M-tap filter). The second prediction is obtained similarly to the first prediction, with the application of second interpolation filter and according to the block pointed by MV0' and MV1' in the reference picture.

Figure 9:
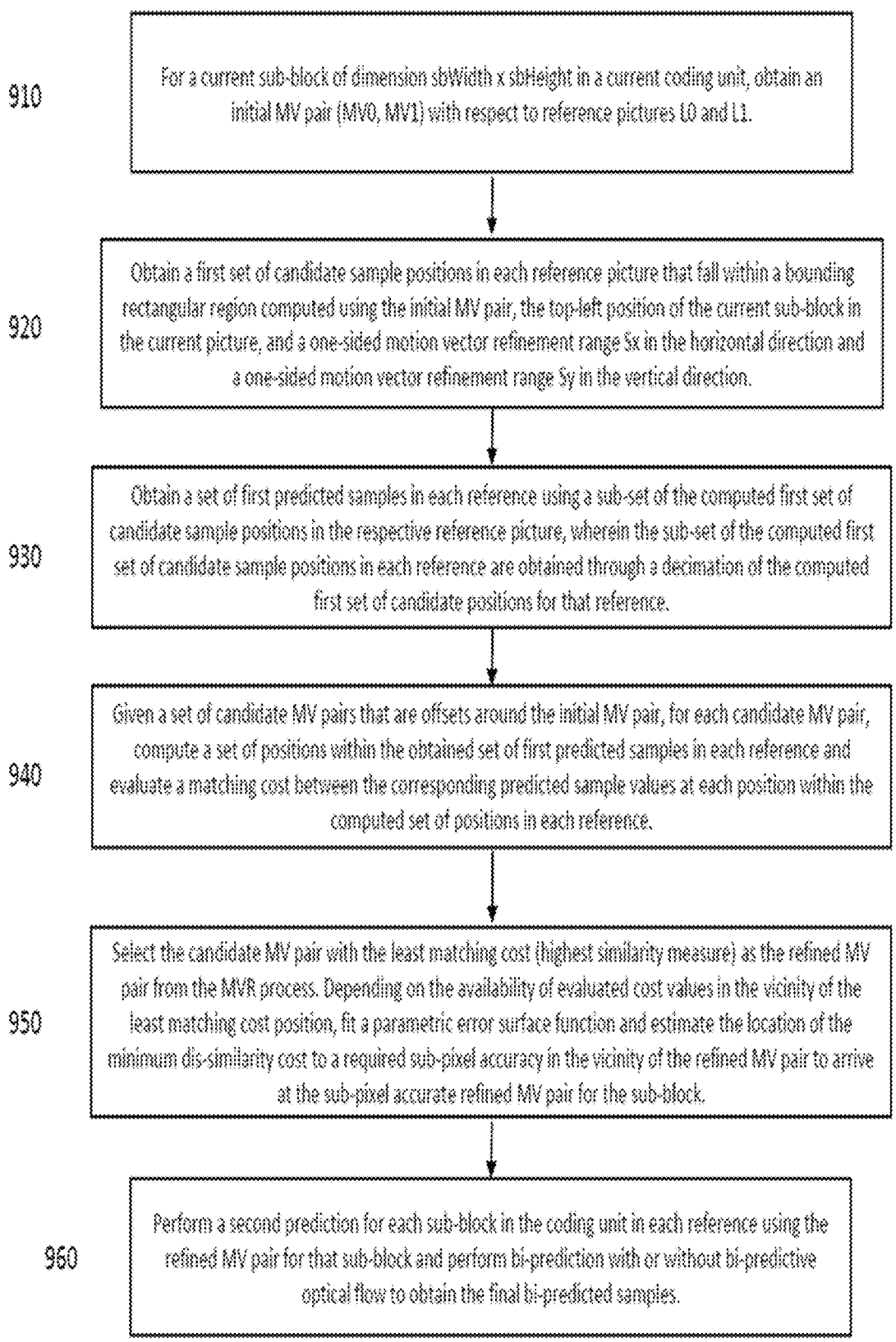
FIG. 9 is a flowchart about one embodiment of obtain the final predicted samples.

The flowchart in FIG. 9 illustrates an embodiment. The block 910 corresponds to operation-0, wherein an initial MV pair with respect to a pair of reference pictures is obtained for a current sub-block in a current coding unit. The block 920 corresponds to operation-1, wherein using the initial MV pair, the top-left luma sample position of the current sub-block in the current picture, the horizontal and vertical one-sided refinement range values Sx and Sy respectively, and the amount of extension to the block that is desired in the horizontal and vertical directions Ox and Oy respectively, a first candidate set of sample positions are obtained. The block 930 corresponds to operation-2, wherein a first set of predicted samples are generated from the reconstructed reference luma samples in the two reference pictures corresponding to the initial MV pair at a subset of sample positions within the first candidate set of sample positions. The subset of sample positions are obtained through a decimation of the first candidate set of sample positions. The block 940 corresponds to operation-3, wherein, predicted samples relative to the dimensions of the current sub-block are used for computing matching cost values for each candidate MV pair used by MVR using the sample values at the subset of sample positions within the first candidate set of sample positions. The block 950 corresponds to operation-4, wherein a refined MV pair is determined based on the computed matching cost values for each candidate MV pair in block 840. The block 860 corresponds to operation-5, wherein the refined MV pair is used to generate a second set of predicted samples and these samples are combined through a bi-prediction process.

The embodiments of the disclosure reduce the complexity of the process of producing prediction samples for interpolation. The proposed disclosure requires a reduced set of prediction samples to be produced. These embodiments also reduce the line buffer requirement. For a vertical one-sided refinement range of Sy and vertical decimation by a factor of 2, (Sy+1) line buffers are sufficient instead of (2*Sy+1) line buffers that were required earlier. Each line buffer has (sbWidth+2*Sx) samples when no horizontal extension is used. If an one-sided horizontal extension of Ox samples is used, then each line buffer will have (sbWidth+2*Sx+2*Ox) samples. At the same time, by modifying the decimation pattern within the candidate blocks to even parity rows for even vertical displacements and odd parity rows for odd displacements, there is only a minimal impact (e.g. 0.02% BDRATE drop) on coding gains.

Figure 11:
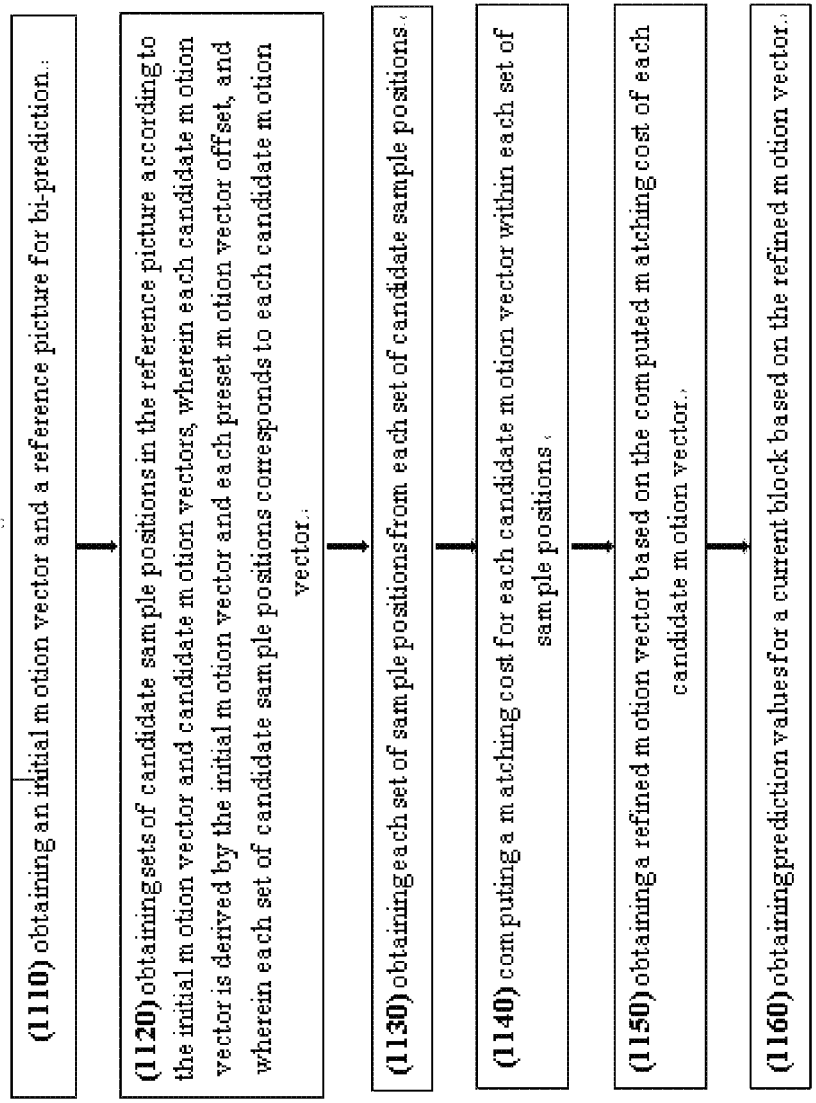
FIG. 11 is flowchart regarding an embodiment according to the first aspect of the present disclosure.

According to an embodiment of the present disclosure, as shown in FIG. 11, the method according to the first aspect includes the following operations: (1110) obtaining an initial motion vector and a reference picture for bi-prediction; (1120) obtaining sets of candidate sample positions in the reference picture according to the initial motion vector and candidate motion vectors, wherein each candidate motion vector is derived by the initial motion vector and each preset motion vector offset, and wherein each set of candidate sample positions corresponds to each candidate motion vector; (1130) obtaining each set of sample positions from each set of candidate sample positions; (1140) computing a matching cost for each candidate motion vector within each set of sample positions; (1150) obtaining a refined motion vector based on the computed matching cost of each candidate motion vector; and (1160) obtaining prediction values for a current block based on the refined motion vector.

Figure 12:
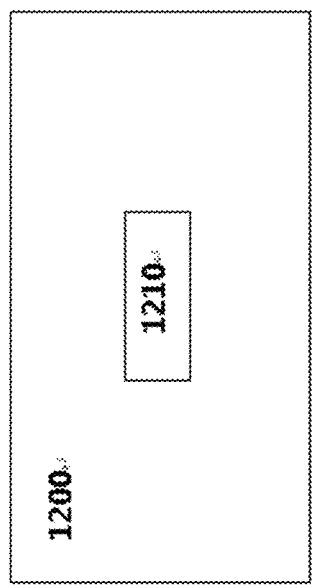
FIG. 12 illustrates an embodiment of an Inter Prediction Unit including motion vector refinement means.

FIG. 12 shows an embodiment of an Inter Prediction Unit 1200 according to the present disclosure. The Inter Prediction Unit 1200 may be the Inter Prediction Unit 244 in FIG. 2 and/or the Inter Prediction Unit 344 in FIG. 3. The Inter Prediction Unit 1200 includes motion vector refinement means 1210. The motion vector refinement means 1210 is configured to obtain an initial motion vector and a reference picture for bi-prediction; obtain sets of candidate sample positions in the reference picture according to the initial motion vector and candidate motion vectors, wherein each candidate motion vector is derived by the initial motion vector and each preset motion vector offset, and wherein each set of candidate sample positions corresponds to each candidate motion vector; obtain each set of sample positions from each set of candidate sample positions; compute a matching cost for each candidate motion vector within each set of sample positions; obtain a refined motion vector based on the computed matching cost of each candidate motion vector; and obtain prediction values for a current block based on the refined motion vector.

The disclosure provides the following further embodiments:

A method for obtaining a prediction sample to be used in inter-prediction of a current block of a video picture (or frame), comprising: obtaining an initial motion vector; obtaining a first set of candidate sample positions in a reference picture (or frame) according to the initial motion vector and a plurality of candidate motion vectors which are MV offsets to the initial motion vector (defining the search area); obtaining first prediction sample values at a subset of positions in the first set of candidate sample positions, according to the initial motion vector and reconstructed luma samples of the reference picture (or frame); computing a matching cost value for each candidate motion vector according to the obtained prediction sample values and a motion vector offset between the candidate motion vector and the initial motion vector; obtaining a refined motion vector based on the computed matching cost value for each candidate motion vector; obtaining second prediction samples for the current block based on the refined motion vector.

The above method, wherein the initial motion vector (in an example, two initial motion vectors are obtained as input) is obtained based on an indication information in a bitstream (for example, an index might be signaled in the bitstream, the index indicates a position in a list of candidate motion vectors. In another example, a motion vector predictor index and motion vector difference value can be signaled in the bitstream. The motion vector that is determined based on an indication information in the bitstream is defined as the initial motion vectors. In another example, reference picture indications can be obtained from the bitstream, the initial motion vectors are obtained based on the reference picture indications. The reference picture indications are used to determine the reference pictures that are pointed by the initial motion vectors).

The above method, wherein the first set of candidate sample positions fall within a bounding rectangular region, and the bounding rectangular region is computed using the initial MV pair, the top-left position of the current sub-block in the current picture, and a one-sided motion vector refinement range in the horizontal direction and a one-sided motion vector refinement range in the vertical direction.

The above method, wherein the subset of sample positions are obtained through a regular decimation of the first set of candidate sample positions.

The above method, wherein the subset of sample positions in the first set of candidate sample positions are chosen as sample positions on alternate rows.

An encoder (20) comprising processing circuitry for carrying out the above method.

A decoder (30) comprising processing circuitry for carrying out the above method.

A computer program product comprising a program code for performing the above method.

A decoder, comprising: one or more processors; and a non-transitory computer-readable storage medium coupled to the processors and storing programming for execution by the processors, wherein the programming, when executed by the processors, configures the decoder to carry out the above method.

An encoder, comprising: one or more processors; and a non-transitory computer-readable storage medium coupled to the processors and storing programming for execution by the processors, wherein the programming, when executed by the processors, configures the encoder to carry out the above method.

In addition, the disclosure provides a method for obtaining a prediction sample to be used in inter-bi-prediction of a current block of a video picture, comprising: obtaining a pair of initial motion vectors for bi-prediction with respect to a pair of reference pictures; obtaining first sets of candidate sample positions in each of the pair of reference pictures according to the initial motion vectors and a plurality of candidate motion vectors with motion vector offsets to the initial motion vectors; obtaining first prediction sample values at a subset of positions in each of the first set of candidate sample positions, according to the initial motion vectors and reconstructed luma samples of the reference pictures; computing a matching cost value for each candidate motion vector according to the obtained prediction sample values and a motion vector offset between the candidate motion vector and the respective initial motion vector; obtaining a refined motion vector based on the computed matching cost value for each candidate motion vector and for each of the initial motion vectors; obtaining second prediction samples for the current block based on the refined motion vectors.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7 / −4 are truncated to 1 and −7/4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators

The following logical operators are defined as follows:
x && y Boolean logical "and" of x and y
x∥y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:

| | |
|---|---|
| > | Greater than |
| >= | Greater than or equal to |
| < | Less than |
| <= | Less than or equal to |
| = = | Equal to |
| != | Not equal to |

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

| | |
|---|---|
| & | Bit-wise "and". When operating on integer arguments, operates on a two's complement representation of the integer value. |

-continued

| | When operating on a binary argument that contains fewer bits than another argument, the shorter argument is extended by adding more significant bits equal to 0. |
|---|---|
| \| | Bit-wise "or". When operating on integer arguments, operates on a two's complement representation of the integer value. When operating on a binary argument that contains fewer bits than another argument, the shorter argument is extended by adding more significant bits equal to 0. |
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |

Assignment Operators

The following arithmetic operators are defined as follows:

| | |
|---|---|
| = | Assignment operator |
| ++ | Increment, i.e., x++ is equivalent to x = x + 1; when used in an array index, evaluates to the value of the variable prior to the increment operation. |
| - - | Decrement, i.e., x- - is equivalent to x = x - 1; when used in an array index, evaluates to the value of the variable prior to the decrement operation. |
| += | Increment by amount specified, i.e., x += 3 is equivalent to x = x + 3, and x += (-3) is equivalent to x = x + (-3). |
| -= | Decrement by amount specified, i.e., x -= 3 is equivalent to x = x - 3, and x -= (-3) is equivalent to x = x - (-3). |

Range Notation

The following notation is used to specify a range of values:

x=y . . . z  x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \text{ \&\& } y >= 0 \\ \text{Atan}\left(\frac{y}{x}\right) - \pi; & x < 0 \text{ \&\& } y < 0 \\ +\frac{\pi}{2}; & x == 0 \text{ \&\& } y >= 0 \\ -\frac{\pi}{2}; & \text{otherwise} \end{cases}$$

Ceil(x) the smallest integer greater than or equal to x.

$$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

$$\text{Round}(x) = \text{Sign}(x) * \text{Floor}(\text{Abs}(x) + 0.5)$$

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table)
to lowest (at bottom of table)
operations (with operands x, y, and z)

"x++", "x−−"
"!x", "−x" (as a unary prefix operator)
$x^y$

"x∗y", "x/y", "x÷y", "$\frac{x}{y}$", "x % y"

"x + y", "x − y" (as a two-argument operator),

"$\sum_{i=x}^{y} f(i)$"

"x << y", "x >> y"
"x < y", "x <= y", "x > y", "x >= y"
"x == y", "x != y"
"x & y"
"x│y"
"x && y"
"x││y"
"x ? y : z"
"x . . . y"
"x = y", "x += y", "x −= y"

Text Description of Logical Operations

In the text, a statement of logical operations as would be described
mathematically in the following form:
a. if(condition 0)
   statement 0
else if(condition 1)
   statement 1
. . .
else /* informative remark on remaining condition */
   statement n
may be described in the following manner:
a. . . . as follows / . . . the following applies:
   If condition 0, statement 0
   Otherwise, if condition 1, statement 1
   . . .
   Otherwise (informative remark on remaining condition),
      statement n
Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:
a. if(condition 0a && condition 0b)
   statement 0
else if(condition 1a││condition 1b)
   statement 1
. . .
else
   statement n
may be described in the following manner:
a. . . . as follows / . . . the following applies:

If all of the following conditions are true, statement 0:
   condition 0a
   condition 0b
Otherwise, if one or more of the following conditions are true, statement 1:
   condition 1a
   condition 1b
. . .
Otherwise, statement n
In the text, a statement of logical operations as would be described mathematically in the following form:
a. if(condition 0)
   statement 0
if(condition 1)
   statement 1
may be described in the following manner:
a. When condition 0, statement 0
b. When condition 1, statement 1.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. An inter prediction method, comprising:
   obtaining an initial motion vector and a reference picture for bi-prediction;
   obtaining one or more sets of candidate sample positions in the reference picture according to a plurality of candidate motion vectors, wherein each candidate motion vector is derived based on the initial motion vector and each preset motion vector offset, and wherein each set of candidate sample positions corresponds to each candidate motion vector;
   obtaining each set of sample positions from each set of candidate sample positions;
   computing a matching cost for each candidate motion vector within each set of sample positions;
   obtaining a refined motion vector based on the computed matching cost of each candidate motion vector; and
   obtaining prediction values for a current block based on the refined motion vector wherein a zipper pattern of positions of interpolated samples in a set of the candidate sample positions are chosen as the set of sample positions, wherein even parity rows produce first predicted samples at a predetermined number of contiguous sample positions that are left (or right) justified, and odd parity rows produce predicted samples at the pre-determined number of contiguous sample positions that are right (or left) justified, respectively.

2. The method of claim 1, wherein the initial motion vector or the reference picture are obtained based on indication information signaled in a bitstream.

3. The method of claim 1, wherein the initial motion vector is obtained according to a motion vector predictor and a motion vector difference value signaled in a bitstream.

4. The method of claim 3, wherein the motion vector predictor is indicated by an index signaled in the bitstream, and wherein the index is used to indicate a position in a list of candidate vector.

5. The method of claim 1, wherein the matching cost is computed using one or more of a similarity metric, a dis-similarity metric, a sum of absolute differences (SAD), a mean removed sum of absolute differences (MRSAD), or a sum of squared errors (SSE).

6. The method of claim 1, wherein a set of the candidate sample positions is within a bounding rectangular region, and wherein the bounding rectangular region is computed by using the initial motion vector, a top-left position of the current block, and a motion vector refinement range in a horizontal direction and a vertical direction.

7. The method of claim 1, wherein a set of sample positions is obtained through a regular decimation of a set of the candidate sample positions.

8. The method of claim 1, wherein sample positions on alternate rows in a set of the candidate sample positions are chosen as the set of sample positions.

9. The method of claim 1, wherein the initial motion vector is a first motion vector or a second motion vector, and wherein the first motion vector and the second motion vector correspond to a different reference picture list.

10. A non-transitory machine-readable storage medium having instructions stored therein, which when executed by a processor, cause the processor to perform operations, the operations comprising:
    obtaining an initial motion vector and a reference picture for bi-prediction;
    obtaining one or more sets of candidate sample positions in the reference picture according to candidate motion vectors, wherein each candidate motion vector is derived by the initial motion vector and each preset motion vector offset, and wherein each set of candidate sample positions corresponds to each candidate motion vector;
    obtaining each set of sample positions from each set of candidate sample positions;
    computing a matching cost for each candidate motion vector within each set of sample positions;
    obtaining a refined motion vector based on the computed matching cost of each candidate motion vector; and
    obtaining prediction values for a current block based on the refined motion vector wherein a zipper pattern of positions of interpolated samples in a set of the candidate sample positions are chosen as the set of sample positions, wherein even parity rows produce first predicted samples at a predetermined number of contiguous sample positions that are left (or right) justified, and odd parity rows produce predicted samples at the pre-determined number of contiguous sample positions that are right (or left) justified, respectively.

11. A decoder, comprising:
    a processor; and
    a memory coupled to the processor to store instructions, executed by the processor, cause the processor to perform operations, the operations comprising:

obtaining an initial motion vector and a reference picture for bi-prediction;

obtaining one or more sets of candidate sample positions in the reference picture according to candidate motion vectors, wherein each candidate motion vector is derived by the initial motion vector and each preset motion vector offset, and wherein each set of candidate sample positions corresponds to each candidate motion vector;

obtaining each set of sample positions from each set of candidate sample positions;

computing a matching cost for each candidate motion vector within each set of sample positions;

obtaining a refined motion vector based on the computed matching cost of each candidate motion vector; and obtaining prediction values for a current block based on the refined motion vector, wherein a zipper pattern of positions of interpolated samples in a set of the candidate sample positions are chosen as the set of sample positions, wherein even parity rows produce first predicted samples at a predetermined number of contiguous sample positions that are left (or right) justified, and odd parity rows produce predicted samples at the pre-determined number of contiguous sample positions that are right (or left) justified, respectively.

12. The decoder of claim 11, wherein the initial motion vector or the reference picture are obtained based on indication information signaled in a bitstream.

13. The decoder of claim 11, wherein the initial motion vector is obtained according to a motion vector predictor and a motion vector difference value signaled in a bitstream.

14. The decoder of claim 13, wherein the motion vector predictor is indicated by an index signaled in the bitstream, and wherein the index is used to indicate a position in a list of candidate vector.

15. The decoder of claim 11, wherein the matching cost is computed by using one or more of a similarity metric, a dis-similarity metric, a sum of absolute differences (SAD), a mean removed sum of absolute differences (MRSAD), or a sum of squared errors (SSE).

16. The decoder of claim 11, wherein a set of the candidate sample positions is within a bounding rectangular region, and wherein the bounding rectangular region is computed using the initial motion vector, a top-left position of the current block, and a motion vector refinement range in a horizontal direction and a vertical direction.

17. The decoder of claim 11, wherein a set of sample positions is obtained through a regular decimation of a set of the candidate sample positions.

18. The decoder of claim 11, wherein sample positions on alternate rows in a set of the candidate sample positions are chosen as the set of sample positions.

* * * * *